INVENTORS.
NATHAN FRIED
JULIUS KAMINETSKY
MAURICE SILVERGLEIT
BY Arthur L Bowers
AGENT
Louis B Applebaum
ATTORNEY 3,570,303
MEANS FOR PREPARING PREPREG GLASS
ROVING FOR EVALUATION
Nathan Fried, Brooklyn, Julius Kaminetsky, Forest Hills, and Maurice Silvergleit, Brooklyn, N.Y., assignors to the United States of America as represented by the Secretary of the Navy
Filed May 6, 1968, Ser. No. 726,951
Int. Cl. G01n 1/00
U.S. Cl. 73—15.4
2 Claims

ABSTRACT OF THE DISCLOSURE

A technique for preparing preimpregnated glass roving for evaluation, including tensioning a specimen of the roving with about two pounds of force, heating the tensioned specimen with a heat source to about 100° C. in seconds, and coincidentally with the heating, illuminating the specimen and observing the illuminated specimen through an optical magnifier for quantity and behavior of entrained gas pockets.

---

The invention described herein may be manufactured and used by or for the Government of the United States of America for governmental purposes without the payment of any royalties thereon or therefor.

BACKGROUND OF THE INVENTION

The "Modern Plastics Enclyclopedia" of 1968 published by McGraw-Hill devotes substantial lineage to products of glass reinforced plastics including products of preimpregnated glass roving commonly termed prepreg; it reviews known techniques for forming glass filaments, preferred types of glass for filaments, protective binder surfacing, coupling agents, types of impregnating resins, forming techniques etc. for prepreg. A prepreg includes resin impregnation in a partially cured state with chemicals distributed therethrough for completing the cure when the prepreg is subjected to heat in a prescribed time-temperature schedule. Prepreg is refrigerated until used to hold back curing. It is marketed in various forms, one of which is roving. Roving comprises a plurality of strands, side-by-side, contiguous, and essentially parallel, approximating a web-like configuration and wherein each strand includes a bundle of continuous glass filaments as small as .00012 inch in diameter. Products of this class of materials are growing in popularity because they can be formed to have high strength, durability, light weight high electrical resistance, design flexibility, plus cost advantages. Cylindrical rocket casings are included among a host of structures that have been formed of these materials, and research is proceeding on deep-diving submersible hull structures formed of this class of material. Heretofore deep diving submersibles have been constructed with a heavy wall to resist the high pressure but which in turn made the vehicle excessively massive and hence negatively buoyant to a substantial degree. For example, the deep-diving submersible Trieste has a massive wall and is designed to operate as a hydrospace balloon, carrying gasoline as flotation material. Higher strength steels and lighter metals, such as titanium have been studied for hull construction in an effort to eliminate or at least minimize the necessity for auxiliary buoyancy materials. Therefore there is a need for a hull of positive buoyancy and that has low weight/displacement ratio as to allow for practical payload, in other words, a material having very high strength to weight ratio. Promise is offered by filament wound glass reinforced plastic. Experimentally, compressive strength as high as 216,900 pounds per square inch has been demonstrated in a structure formed of a particular prepreg roving. However quality of prepreg roving varies widely even where materials that constitute any particular prepreg roving is nominally unchanged. If the prepreg is too far advanced toward set the quality of the product formed is unsatisfactory. If the prepreg roving includes too much entrained gas or volatiles or generates too much gas when curing the product formed is unsatisfactory.

It is assumed on the basis of experiments that the resin in a filament-wound composite under compression supports the long slender filamentous glass columns, stabilizing them, preventing them from buckling prematurely, and thereby enabling the glass to support load. Since the load is supported largely by the glass, the percentage of glass is optimized consistent with integrity of resin where high strength is demanded in the product. It is further assumed that the composite takes load up to the compressive strength limit which is the level at which the resin yields, and when that happens, filament support is reduced, filaments buckle, and the composite fails. However, failure could occur at lower load level either by debonding or by progressive decrease of filament support by the resin matrix as increasing loading produces a Poisson effect.

Quality of prepreg roving has been determined heretofore from the quality of the product formed therefrom, a wasteful procedure.

An object of this invention is to evaluate prepreg prior to formation of a product, as simply and inexpensively as is possible to detect at least the manifestly bad prepreg.

Other objects and advantages will appear from the following description of an example of the invention, and the novel features will be particularly pointed out in the appended claims. In the accompanying drawings:

Figure 1:
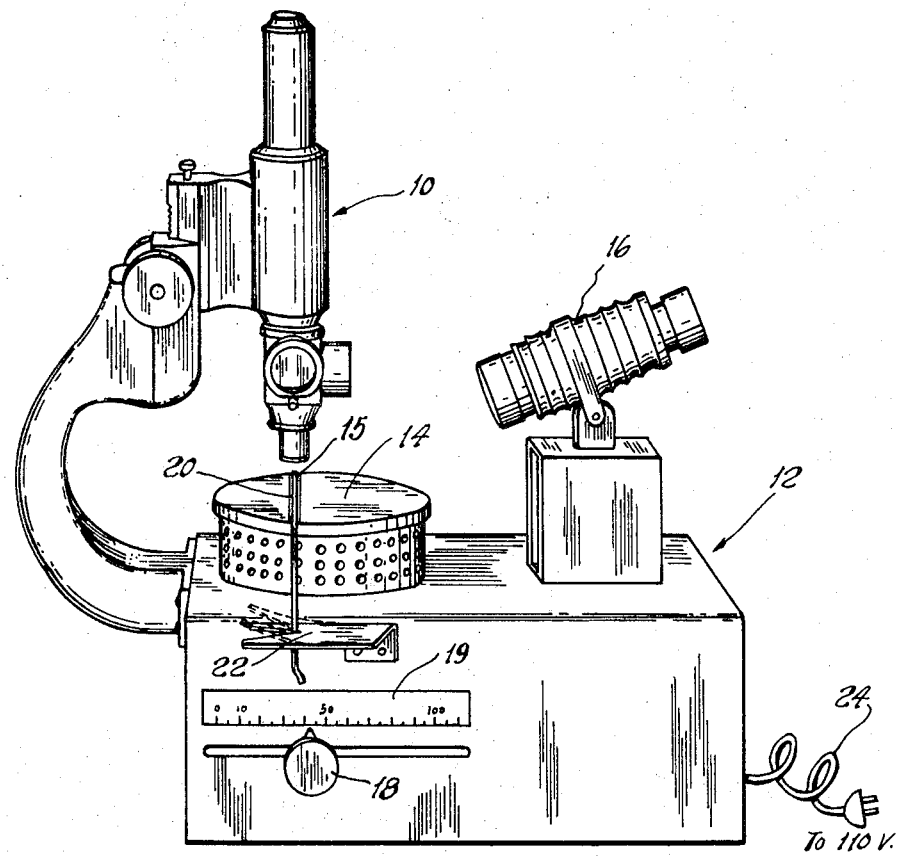
FIG. 1 is side view of a preferred embodiment of the invention for use in evaluating prepreg.
Figure 2:
FIG. 2 is a plan view on an enlarged scale of a simple specimen gripping and tensioning spring.

In the embodiment shown in FIG. 1 there is provided a microscope-type optical magnifier assembly 10, on the order of 15 power, secured to the side wall of a base assembly 12 having a stage 14 supporting a specimen 15, across the line of sight of the optical magnifier. A high intensity illumination source 16 is carried by the base to illuminate the specimen. The base includes conventional heater wire and a conventional temperature control switching element not shown, in electrical series with the heater wire, the control element being selectively adjustable by a movable element 18 that is displaceable along a temperature scale 19. The adjustable feature may be any of those employed in household appliances. The heater circuit and illumination source may be designed to operate from a house current circuit to provide a temperature range of 90° C.–110° C. on the surface of stage 14. The adjustment feature may be omitted and the stage may be designed for a fixed temperature preferably 100° C. which has proven to be satisfactory for all specimens tested. The surface of stage 14 is formed with a groove 20 which intersects the line of sight or viewing axis of the optical magnifier 10. Preferably the flat surface and groove of stage 14 is coated with Teflon or the like for low adhesion. Some resin of each specimen deposits on the heated stage. A specimen of prepreg roving may be readily nested in the groove 20 and pulled downwardly and held finger tight. Alternatively, friction-grip spring means 22 which may be a bifurcated flat spring 22 shown in FIG. 2 is secured to the base on each side of the stage 14 to enable a specimen nested in groove 20 to be rapidly frictionally engaged by both springs 22 for tensioning the specimen with approximately two pounds force. Any resin that separates from the heated prepreg specimen and deposits on the stage is readily removable afterward from the coated surface of the stage.

When the apparatus shown in FIG. 1 is readied for use, line cord 24 is plugged into a socket, illumination source 16 is switched on, and the temperature adjusting means 18 is set. After a few minutes wait for the temperature to stabilize a specimen is engaged in one spring means 22, pulled tight, nested in the groove, and either engaged in the other spring means 22 or finger gripped, and at the same time the optical magnifier focus is adjusted, if necessary. The observable effect of interest occurs for about the first quarter minute, but is most clearly observed in the first few seconds.

Figure 3:
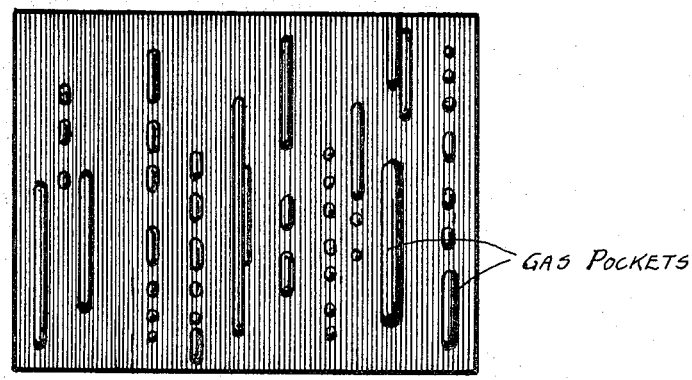
FIGS. 3 and 4 are drawings of photomicrographs of obviously bad and apparently satisfactory prepreg, respectively.
Figure 4:
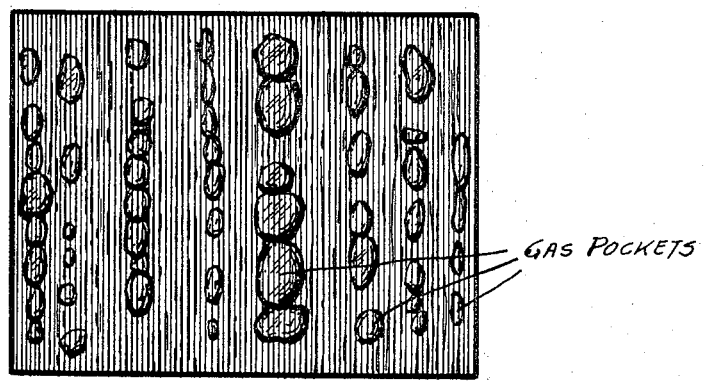

In FIG. 4 there is shown an image of a specimen of unsatisfactory prepreg. The approximately parallel elements are glass fibers. The surface of the prepreg is disturbed by bubbling; minute pockets of gas explode through the surface. No longitudinal migration of gas pockets is observed. In a relatively short time the disturbance ends. In FIG. 3 there is shown an image of a specimen of prepreg manifesting dramatically different characteristics. There is no surface disturbance; random-size and random distributed elongate pockets of gas are seen migrating slowly along various ones of the fibers. All of the gas pockets are minute. Transverse size of most is comparable to fiber size. There is some slight sidewise adjustment of fibers as gas pockets migrate along between fibers. The degree to which gas pocket migration occurs is related to the tension on the specimen. Without tension there is substantially less migration. The gas pockets are difficult to distinguish unless they migrate. Since the quantity of gas pockets are related to the quality of the final product, tensioning the specimen is important.

Presumably the observed effect illustrated in FIG. 4 occurs because the prepreg resin is too far advanced toward set so that pockets of gas are encased by a skin of relatively hardened resin and that the resin matrix generally does not soften sufficiently to permit gas pocket expansion and migration. The heated pockets of trapped gas increase in pressure sufficiently in seconds to rupture the containing wall of resin and explode through the surface. The degree to which the effect occurs is related to the volume of pocket of gas trapped during the process of applying the resin mix to the roving, the quantity of volatiles in the prepreg, and the quantity of gas generated in the hardening process. Experience has shown that a structure formed by filament winding the prepreg roving which manifests behavior as shown in FIG. 4 is unsatisfactory. If this prepreg roving is wound on a flat mold to form a plate and then subjected to heat and pressure, a frothy ooze expands out from the margin of the compressed heated structure as the curing progresses. The cured structure proved to be high in percentage volume of voids and of generally poor quality. As the resin of the specimen shown in FIG. 3 sets, the gas pocket migration ceases. There is no explosion of gas pockets through the surface after migration stops because gas expansion took place before the resin began to set. Obviously if there are too many gas pockets the structure formed from the material is too weak.

Figure 5:
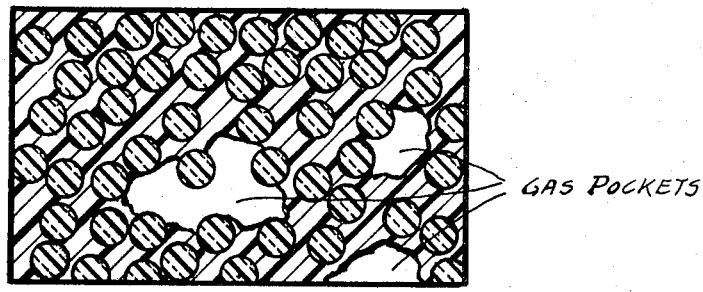
FIG. 5 is a drawing of a photomicrograph of a cross section of glass filament and matrix showing gas pockets.

FIG. 5 is a drawing of a photomicrograph of a cross section of a specimen of prepreg showing glass filaments, resin, and gas pockets showing that each pocket is contiguous with filaments substantiating that the gas pockets migrate along filaments.

To nondestructively check a prepreg roving structure for voids, the structure is immersed in water and is scanned in the manner of a raster by tanden-connected acoustic projector and acoustic detector on opposite sides of the specimen. Acoustic energy transmitted by the structure and that exceeds a selected threshold level established on the basis of calibration data controls a marking element of an x–y recorder; the marking element traces on a recording, the movement of the projector and detector relative to the specimen. Gaps in the record represent local areas of excessively high attenuation, indicating excessive void content at each of those areas. By repeating the test at two or more threshold levels, a major amount of information of strength and other properties of the structure is discovered.

The validity of the invention was proved not just by the nondestructive test described but by other tests and by direct observation of the bubbly ooze around the margins of a structure under heat and pressure for setting the resin of the prepreg.

It will be understood that various changes in the details materials, and arrangements of parts (and steps), which have been herein described and illustrated in order to explain the nature of the invention, may be made by those skilled in the art within the principle and scope of the invention as expressed in the appended claims.

We claim:
1. A method of preparing prepreg fiber glass roving for evaluation comprising:
   subjecting a specimen of the roving to tension on the order of two pounds,
   directing intensive illumination at the specimen,
   imaging the illuminated specimen on an enlarged scale to facilitate viewing of behavior of gas pockets in the specimen, and
   heating the specimen rapidly to about 100° C. to cause gas pockets in the specimen either to migrate longitudinally or to cause localized ballooning and bubbling at the surface of the specimen during the first several seconds after heating is initiated.

2. Apparatus for preparing prepreg fiber glass roving for evaluation comprising:
   a base,
   a specimen support carried by the base and having a groove surfaced with an anti-adherent material for nesting a short length of the roving,
   means for heating the specimen support to approximately 100° C. carried by the base,
   friction-grip spring means caried by said base for tensioning a specimen of the roving nested in the groove,
   microscope optical means carried by said base for focusing on a specimen nested in the groove, and
   means carried by the base for directing intense illumination at the specimen nested in the groove.

References Cited

Wild pamphlet: Mi GO4e, General Purpose and Research Microscope, pp. 14–16 and 21–25 received in Patent Office Oct. 10, 1961, available class 350/8.

RICHARD C. QUEISSER, Primary Examiner

J. K. LUNSFORD, Assistant Examiner